United States Patent
Sommers et al.

[19]

[11] Patent Number: 5,940,076
[45] Date of Patent: Aug. 17, 1999

[54] GRAPHICAL USER INTERFACE FOR AN ELECTRONIC DEVICE AND METHOD THEREFOR

[75] Inventors: Daniel Ray Sommers; David Owen Garner, both of Roswell; Michael Allen Zingman, Marietta, all of Ga.

[73] Assignee: Motorola, Inc., Schaumburg, Ill.

[21] Appl. No.: 08/980,563

[22] Filed: Dec. 1, 1997

[51] Int. Cl.⁶ .................................................. G06F 3/14
[52] U.S. Cl. ..................... 345/339; 345/352; 345/348; 345/354
[58] Field of Search .................. 345/352, 354, 345/348, 339, 349

[56] References Cited

U.S. PATENT DOCUMENTS

| | | | |
|---|---|---|---|
| 5,295,243 | 3/1994 | Robertson et al. | 345/348 |
| 5,317,687 | 5/1994 | Torres | 395/349 |
| 5,515,486 | 5/1996 | Amro et al. | 345/349 |
| 5,706,448 | 1/1998 | Blades | 395/326 |
| 5,745,716 | 4/1998 | Tchao et al. | 345/350 |
| 5,798,760 | 8/1998 | Vayda et al. | 345/352 |
| 5,825,353 | 10/1998 | Will | 345/184 |

OTHER PUBLICATIONS

"PageWriter™ 2000 User's Manual" by Motorola, Inc., Document No. 6880496G51–O, 1997.

Primary Examiner—Raymond J. Bayerl
Assistant Examiner—Thomas T. Nguyen
Attorney, Agent, or Firm—Philip P. Macnak

[57] ABSTRACT

A communication device (50) includes a display (68) for presenting information to the user. When selecting between different options/features (402–416) the currently displayed options/features are displayed in user selectable fields (422–426) which are located along an arc. When a device user picks an option/feature which is currently not being displayed (408–416), the graphical user interface commences an animation process (620) which makes the user selectable fields (422–426) seem to be part of a wheel (420) which is spinning. Once the main process has loaded up the required off-screen options/features the animation process stops.

22 Claims, 5 Drawing Sheets

GRAPHICAL USER INTERFACE FOR AN ELECTRONIC DEVICE AND METHOD THEREFOR

FIELD OF THE INVENTION

This invention relates in general to electronic devices, and more specifically to a method and apparatus for providing a graphical user interface for an electronic device.

BACKGROUND OF THE INVENTION

As electronic devices such as pagers and radiotelephones become smaller in size, it becomes increasingly difficult to convey to the user all of the electronic device's available options, configurations, features, etc. It becomes even more difficult in situations where the electronic device is "user configurable" (e.g., by using flash memory cards, etc.) since the device's graphical user interface (GUI) has to support these expansion capabilities.

Some prior art electronic devices have attempted to solve this GUI problem by providing a series of pre-rendered display scenes and displaying them in sequence on the electronic device's display. The user can with the assistance of these display scenes select amongst the electronic device's available options, features, etc. This approach although useful for some applications, is not very helpful in situations in which the electronic device's display size is small and the number of selections/options available to the device user is large. Therefore, a need exists for a method and apparatus which can provide a solution to the above mentioned problem.

DESCRIPTION OF THE PREFERRED EMBODIMENT

Figure 1:
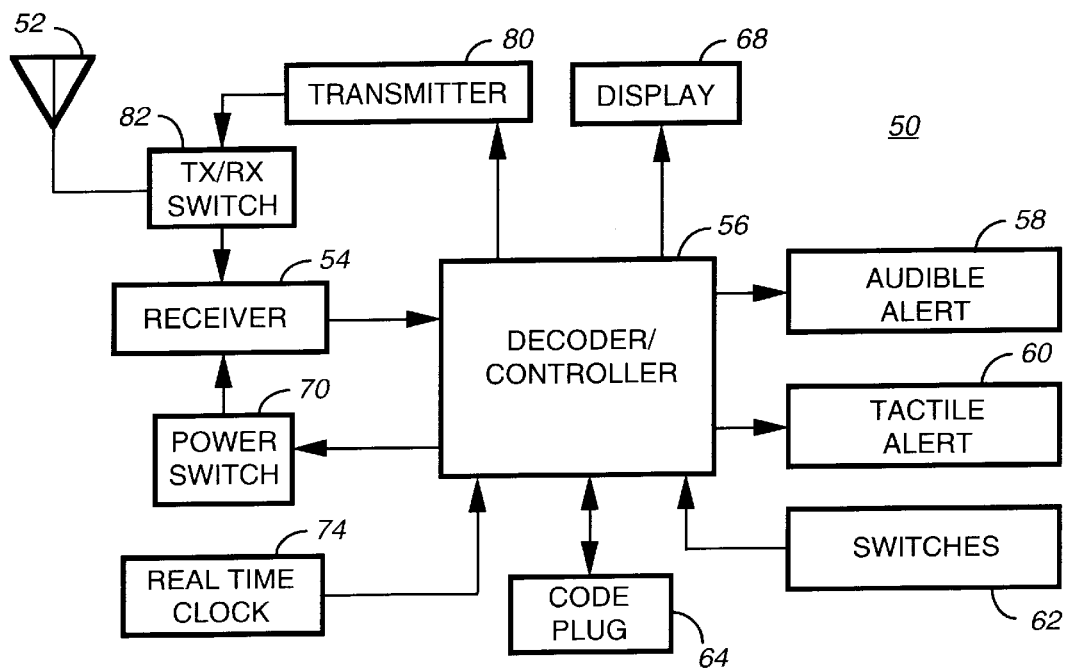
FIG. 1 is a block diagram of an electronic device in accordance with the preferred embodiment of the present invention.

Referring now to the drawings and in particular to FIG. 1, an electrical block diagram of a electronic device such as a selective call transceiver (e.g., a two-way pager, etc.) in accordance with the preferred embodiment of the present invention is shown. The selective call transceiver 50 comprises an antenna 52 for intercepting transmitted radio frequency (R.F.) signals which are coupled to the input of a receiver section 54. The R.F. signals are preferably selective call (paging) message signals which provide a receiver address and an associated message, such as numeric or alphanumeric message. However, it will be appreciated that other well known paging signaling formats, such as tone only signaling or tone and voice signaling, would be suitable for use as well. The receiver 54 processes the R.F. signal and produces at the output a data stream representative of a demodulated address and message information. The demodulated address and message information are coupled into the input of a decoder/controller 56 which processes the information in a manner well known in the art. A power switch 70, coupled to the decoder/controller 56, is used to control the supply of power to the receiver 54, thereby providing a battery saving function as is well known in the art for use with selective call receivers.

For purposes of this illustration, it will be assumed that the FLEX™ (FLEX™ a trademark of Motorola, Inc.) protocol for two-way paging which is well known in the art is used, although other signaling formats (e.g., POCSAG, etc.) could be utilized as well. When the address is received by the decoder/controller 56, the received address information is compared with one or more addresses stored in a code plug (or code memory) 64, and when a match is detected the message is stored in memory. Optionally, an alert signal is generated to alert a user that a selective call message, or page, has been received. The alert signal is directed to an audible alerting device 58 for generating an audible alert or to a tactile alerting device 60 for generating a silent vibrating alert. Switches 62 allow the user of the selective call receiver to select between the audible alert 58 and the tactile alert 60 in a manner well known in the art.

The message information which is subsequently received is stored in memory (not shown) and can be accessed by the user for display using one or more of the switches 62 which provide such additional functions as reset, read, delete, etc. Specifically, by the use of appropriate functions provided by the switches 62, the stored message is recovered from memory and processed by the decoder/controller 56 for displaying by a display 68 which enables the user to view the message. A real time clock circuit 74 provides conventional timing features such as the information required to display time of day information on display 68. A paging transmitter 80 under the control of controller 56 transmits messages and user requests. A conventional antenna switch 82 selectively couples the transmitter 80 or receiver 54 to antenna 52.

Figure 2:
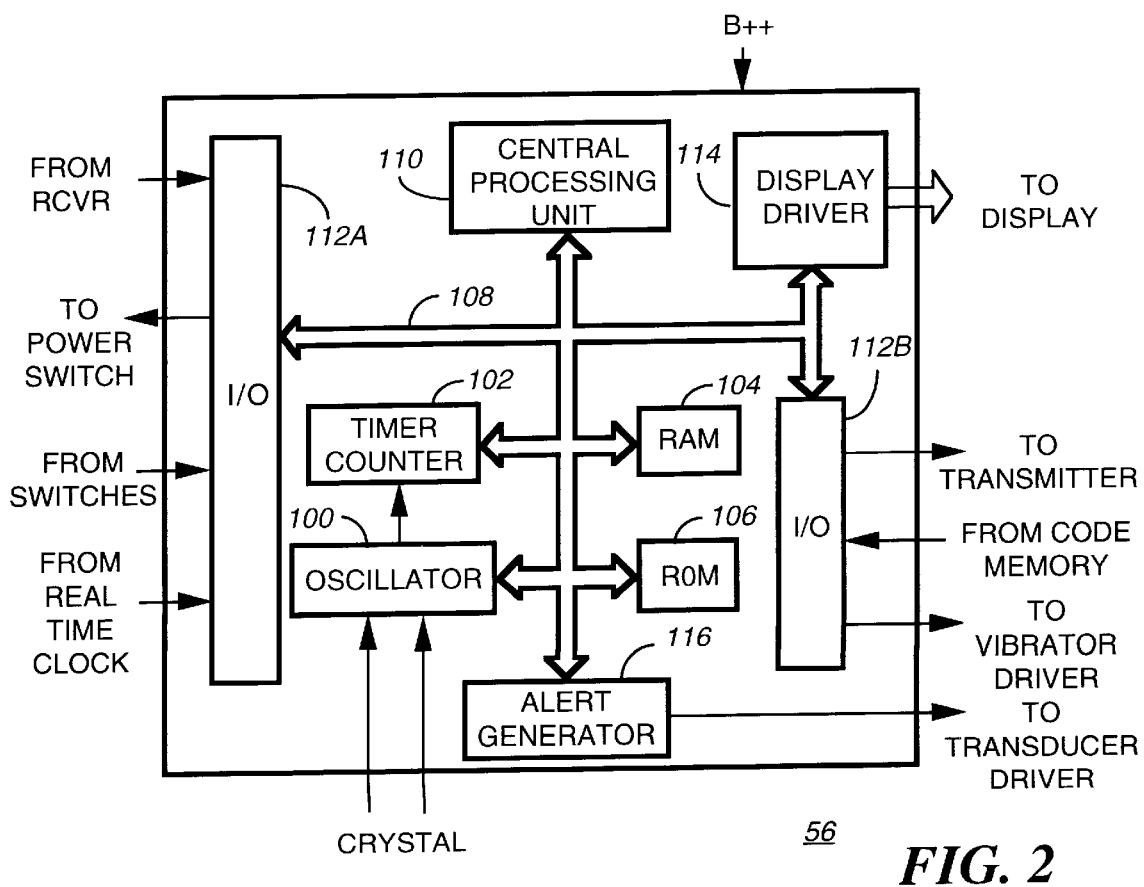
FIG. 2 shows a more detailed block diagram of the decoder/controller of FIG. 1 in accordance with the preferred embodiment of the invention.

The controller/decoder 56 of FIG. 1 can be constructed utilizing a microcomputer as shown in FIG. 2, although other hardware arrangements as known in the art can also be used. FIG. 2 is an electrical block diagram of a microcomputer based decoder/controller suitable for use in the selective call receiver of FIG. 1. As shown, the microcomputer 56 can preferably comprise a MC68HC05 or MC68HC11 or other similar microcomputer manufactured by Motorola, Inc. which preferably includes an on-board display driver 114. The microcomputer 56 includes an oscillator 100 which generates the timing signals utilized in the operation of the microcomputer 56. A crystal, or crystal oscillator (not shown) is coupled to the inputs of the oscillator 100 to provide a reference signal for establishing the microcomputer timing. A timer/counter 102 couples to the oscillator 100 and provides programmable timing functions which are utilized in controlling the operation of the receiver. A RAM (random access memory) 104 is utilized to store variables derived during processing, as well as to provide storage of message information which are received during operation as a selective call receiver as previously discussed. A ROM (read only memory) 106 stores the subroutines which control the operation of the receiver as well as the routines required to perform the present invention. Although the RAM 104 and ROM 106 have been shown internal to the controller 56, these memory types can also include external memory devices coupled to the controller 56.

It will be appreciated that in many microcomputer implementations, the programmable-ROM (PROM) memory area can be provided by, or further include, an EEPROM (electrically erasable programmable read only memory). The oscillator 100, timer/counter 102, RAM 104, and ROM 106 couple through an address/data/control bus 108 to a central processing unit (CPU) 110 which performs the instructions and controls the operations of the microcomputer 56.

The demodulated data generated by the receiver. is coupled into the microcomputer 56 through an input/output (I/O) port 112A. The demodulated data is processed by the CPU 110, and when the received address information is the same as the code-plug memory which couples into the microcomputer through an I/O port 112B, the message, if any, is received and stored in RAM 104. Recovery of the stored message, and selection of the predetermined destination address, is provided by the switches which are coupled to the I/O port 112A.

In one embodiment of the invention, at the time a message is received, an alert signal is generated which can be routed through the data bus 108 to an alert tone generator 116 that generates the alert signal which is coupled to the audible alert device 58 that was described above. Alternatively, when the vibrator alert is selected as described above, the microcomputer generates an alert enable signal which is coupled through data bus 108 to the I/O port 112B to enable generation of a vibratory, or silent alert.

The battery saver operation of pager 50 is controlled by the CPU 110 with battery saving signals which are directed over the data bus 108 to the I/O port 112A which couples to the power switch. Power is periodically supplied to the receiver to enable decoding of the received selective call receiver address signals and any message information which is directed to the receiver. substitutions and equivalents will occur to those skilled in the art without departing from the spirit and scope of the present invention as defined by the appended claims.

Figure 3:
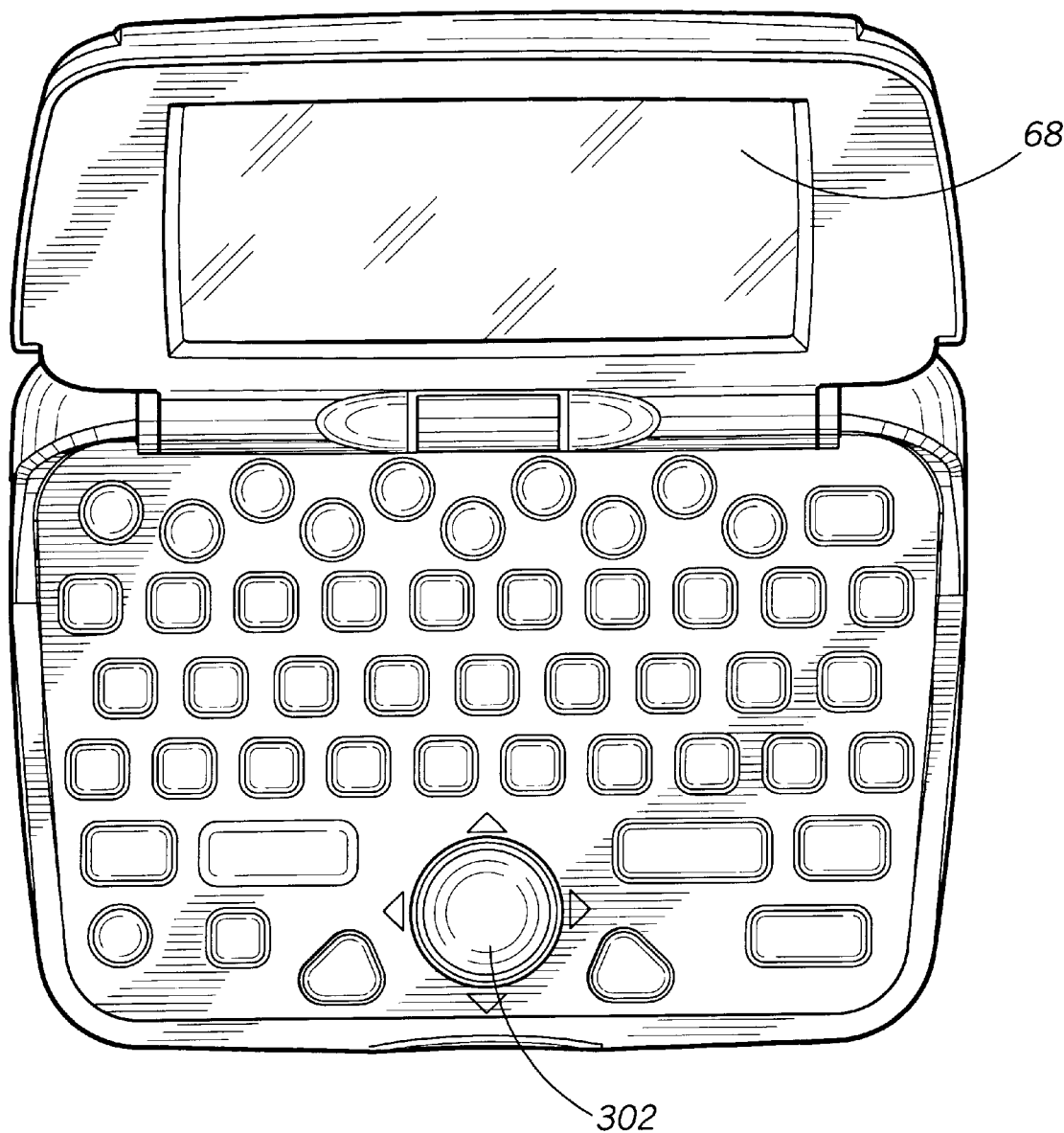
FIG. 3 shows an electronic device in accordance with the preferred embodiment.

Referring now to FIG. 3, a top view of the two way pager is shown. In the preferred embodiment the two way pager 50 comprises a PAGEWRITER™ 2000, although the present invention can be used with any electronic device which requires or could use a graphical user interface as will be explained below. Operational control of the device is controlled by a keypad which includes a plurality of user controls including user control 302 which allows a user to move within different fields (user selectable) or button locations which are displayed on display 68. User control 302 provides the user directional control (up, down, right, left) of which field (button) is currently highlighted on display 68. The operation of two way pager 50 is discussed in detail in the PAGEWRITER™ 2000 User's manual which is hereby incorporated by reference.

Figure 4:
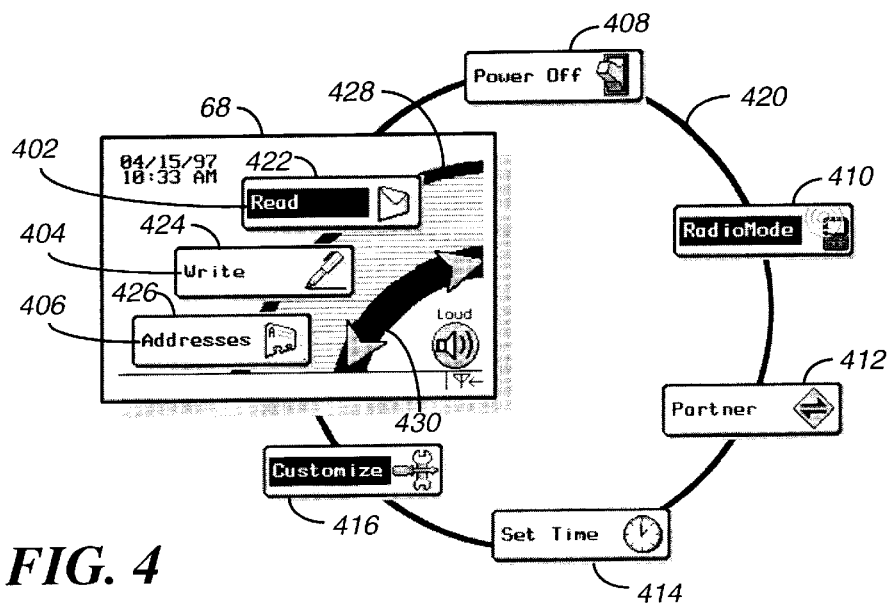
FIG. 4 shows one embodiment of the GUI in accordance with the invention.

In FIG. 4, one embodiment of the present invention's "wheel" GUI is shown. A plurality of available features/options (applications) 402–416 are rotated through the display 68 into user selectable fields or buttons 422, 424 and 426, in this particular example in groups of three. The currently displayed features/options are 402–406. Using user control 302, a user can navigate to the other choices (offscreen options) 408–416 available to him/her. In accordance with the invention, the selectable features/options 402–416 are rotated onto the screen onto the user selectable fields or buttons locations 422, 424 and 426 either clockwise or counterclockwise in groups of three. Although other designs can accommodate the introduction of a different number of feature/options (applications) which are rotated onto the display into the user selectable fields.

The wheel concept of the present invention gives the user a reference which is immediately familiar, a section of a wheel 420. By adding more options/features the wheel 420 simply gets bigger. Yet the user interface still presents the user a predetermined number of choices, in this embodiment three (number of displayed fields can be changed based on the design) and the user is not confused or frustrated by more choices being added/deleted.

The button locations or user selectable fields 422–426 are placed in a radial orientation with respect to each other on display 68. The three viewable user selectable fields 422–426 are presented on the display screen 68 in an arc arrangement. Arced line 428 which interconnects the user selectable fields (buttons) 422–426 gives the further impression to the device user that the user selectable fields 422–426 are part of a circle or wheel full of features/options 402–416. The display 68 in the preferred embodiment shows an extra arced line 430 having arrows pointing in opposite directions which further highlights the rotational GUI. It is worth noting that in the preferred embodiment there is one more option/feature which is not shown in FIG. 4 and is labeled "Available" meaning that it is not presently programmed to accomplish a task.

Figure 5:
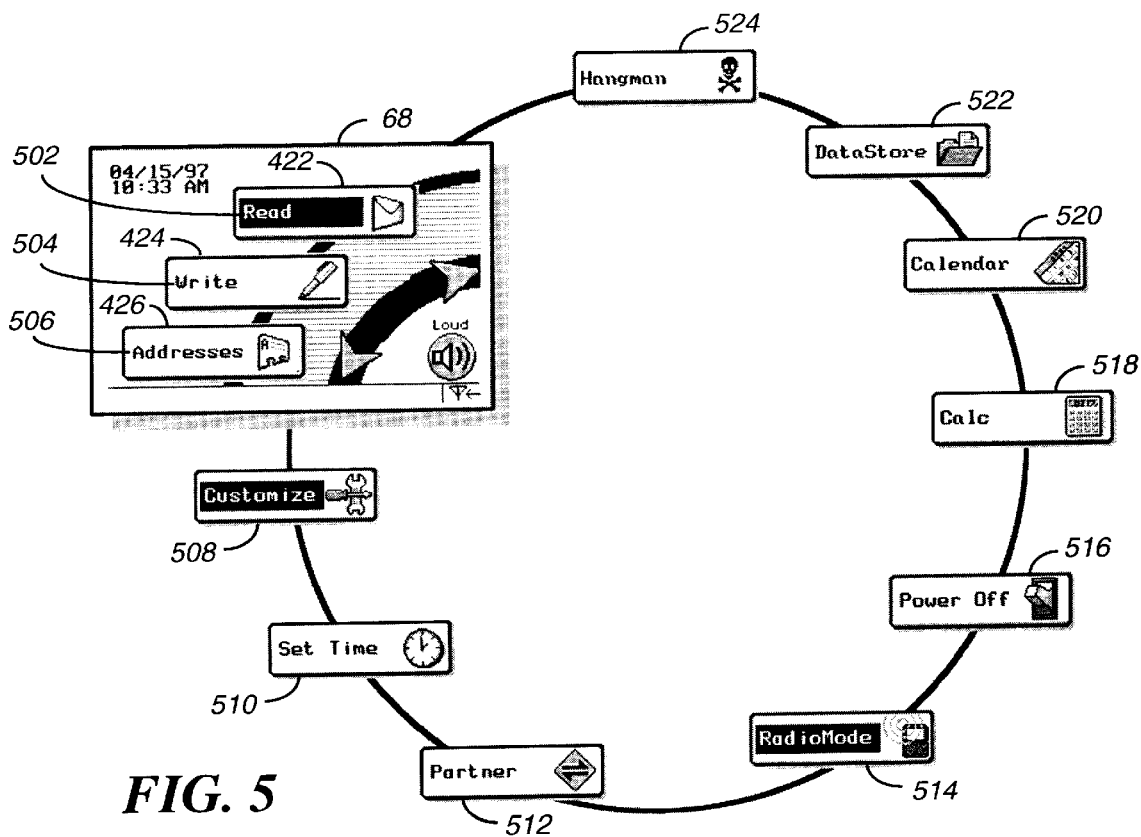
FIG. 5 shows a secondary embodiment of the GUI in accordance with the invention.

A wheel having more application choices is shown in FIG. 5. In this embodiment, the number of offscreen application choices 508–524 are more numerous than the offscreen choices 408–416 found in the example shown in FIG. 4. However, like in the example shown in FIG. 4, the GUI remains the same, presenting just three displayed (or another number) choices on display 68, in this case features/options 502–506.

In the present invention the wheel is also "spun" to add further to the user's frame of reference. When the user activates user control 302 either up or down to reach off screen applications (e.g., 408–416), the three new applications which are brought onto display 68 are rotated quickly through the user selectable fields (e.g., 422–426) either clockwise in the case the up arrow was depressed or counterclockwise in the case the down arrow was depressed. This quick rotation through the user selectable fields 422–426 creates the effect that a wheel is being spun, making the GUI easy to understand for the user. If the new choices were simply drawn on the screen instead of rotated onto the screen, the user would have less of a point of reference for where the choices came from and how to navigate to the next set of choices. The animation process as well be explained below is thus an important addition to the wheel concept mentioned above.

Figure 6:
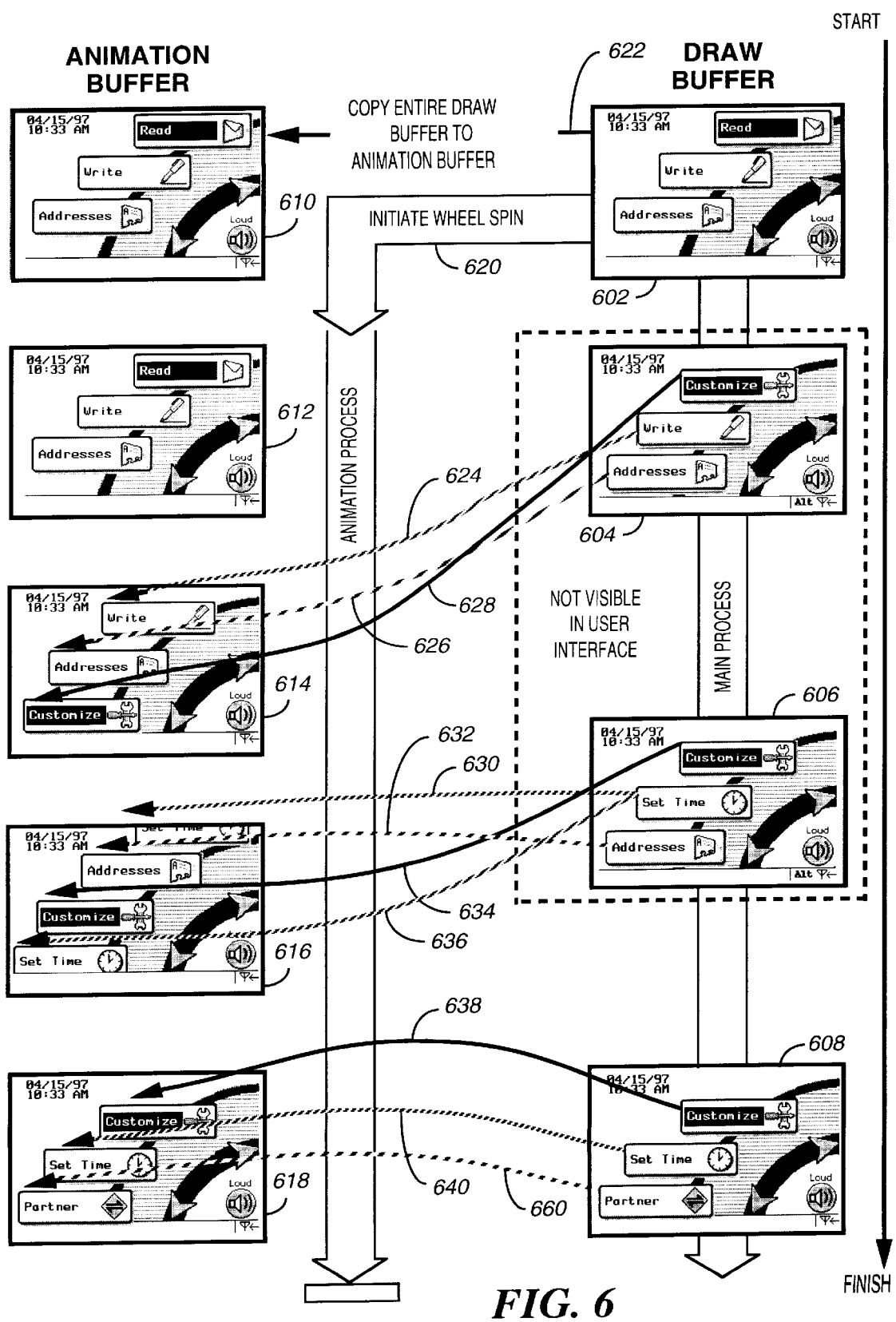
FIG. 6 highlights the operation of the animation and draw buffers in accordance with the preferred embodiment of the invention.

The discussion of the present invention's animation and draw buffers is illustrated in FIG. 6. In the present invention, given the pager's limited CPU and memory capabilities which can be used for the GUI, all screen updates are drawn directly into the user-visible screen buffer in order to save power and memory. In the preferred embodiment, the screen buffer update and the animation are coordinated to yield the illusion of the new option fields rotating into place while they are in fact simply drawn in place.

In the preferred embodiment, two processes are running simultaneously in a multi-taksing environment under the control of controller 56. The main process always draws into a "Draw Buffer" which is usually and in the preferred embodiment is the user-visible screen buffer. When rendering a scene, the user sees all of the intermediate erasures and draws which make up the new scene. But as a result of the invention, the user sees the new scene evolve smoothly, as rendered by the parallel animation process. This gives the illusion to the user that the portion of the wheel 420 which is visible to the user on display 68 is spinning to get some of the "off screen" option/feature fields onto the display (in the case of FIG. 4, off-screen options/features 408–416).

The present invention's animation buffer performs its tasks without the main process having to be burdened with any interaction with the animation. As the main process draws into the screen buffer, the animation task steals the rendered data from the main screen and incorporates it into the animation. Thus when the animation has run to completion, the new data from the screen buffer will be displayed on the animation screen. In fact, the last scene of the animation is simply a switch back to the display buffer. The animation and draw buffers are preferably memory sections within RAM 104.

The only coordination between the two processes is the forking of the animation process by the main process. Once the animation has been launched, the main task simply runs as always. Another advantage to this mechanism is that if the animation cannot run for any reason (e.g., low memory, high-priority tasks taking over, etc.) the entire process can be ignored and the main buffer simply gets re-drawn with no loss of system integrity.

In order to better understand the invention, the process of moving from one set of available options or applications which are currently displayed on display 68 to a new set of available options/features (applications) which are currently off-screen will be discussed in accordance with the preferred embodiment. It is worth noting that in order to enhance the wheel's rotation feature, in the preferred embodiment, new features/options are introduced on screen in groups of three into the user selectable fields or buttons 422–426 which are located along an arc when displayed and offset to each other. For example in FIG. 4, a first subset of applications 402–406 are currently displayed within user definable fields 422–426. If the user control 302 is activated, a second subset of applications either 416–412 or 408–412 would be displayed depending if the up or down arrow were depressed.

The process starts with display screen 602 which shows the presentation of the three presently available applications (Read 402, Write 404 and Addresses 406) available to the user which are displayed within the user selectable fields 422–428. If the user wants to select amongst one of the presently displayed applications, he simply presses the up/down arrows on user control 302 until the desired application is highlighted, then the user can select the application by depressing another user control. If the user however does not want to activate any of these three presently displayed applications, the user by pressing the down arrow (or up arrow in another example), will be able to navigate to the next available set of application (option) fields which are currently off-screen. If the currently highlighted field is field 422 pressing the up arrow will cause the animation process to commence. If the currently highlighted field is field 426, pressing the down arrow will cause the animation process to commence. Upon the user activating the user control 302 one or more times, the "wheel spin" animation process is begun as shown by arrow 620.

Once the animation process is commenced, the information on the draw buffer is copied to the animation buffer in step 622. As such, the animation buffer will have stored in it the same information that was on display screen 602, which is illustrated as screen 610. This copy becomes the first scene of the animation. At this point the display driver is switched away from the draw buffer to present the contents of the animation buffer to the user in view 610. The benefits of copying the entire draw buffer is that it preserves all information on the screen such as time, date and messaging status (e.g., in range, unread message, etc.).

The animation process 620 then erases the three buttons that were copied into the animation buffer. The animation process then generates three pointers to the three buttons in the draw buffer shown in view 602 and re-draws the three buttons in the next positions in the animation (e.g., slightly upward as shown in view 612. At the same time the animation process is re-drawing the buttons, the main process is updating the buttons in the draw buffer to the new choices starting by re-drawing the "Customize" button first 604. While the re-draw of the top button occurs in view 604, the animation process again copies the three buttons from the draw buffer to the animation buffer but since the top button has been re-drawn, the change is reflected in the animation buffer as a new choice being rotated "onto" the screen in view 614.

The animation process, to create the view of 614 will first copy from pointer 628 to display the bottom button, then from pointer 626 to display the middle button, then from 624, to display the top button. This scene is then presented to the user as a rotation of the "Customize" application onto the screen, while the "Read" application has rotated off the screen. The animation process and the main process then continue in parallel and when the main process re-draws the second button ("Write" button to "Set Time") as in view 606, the animation process copies the buttons to 632, 634 and 636. Note that the middle button on view 606 is actually drawn in two locations: the partially drawn button at the bottom of view 616 and the partially drawn top button shown by line 630. This is because the draw buffer has destroyed the "Write" application button with the "Set Time" button before the animation process rotated it off screen. This partial button enhances the "moving wheel" effect.

As copying continues, the main process eventually draws the third button shown in view 608 (the last new option "Partner" in the bottom user selectable location) in the draw buffer and the animation process copies the three buttons in the order of 638, 640, 660 which shows the three choices almost in their final positions in view 618. To complete the animation sequence, the final scene is the draw buffer itself which is displayed as the animation process terminates and changes the display driver to display the draw buffer 608. The last screen of the "wheel spin" animation is this switch back from screen 618 to display buffer screen 608. The animation screens 610–618 are displayed in a smooth and quick fashion such that the user when viewing display 68 perceives that the wheel 420 is spinning.

Figure 7:
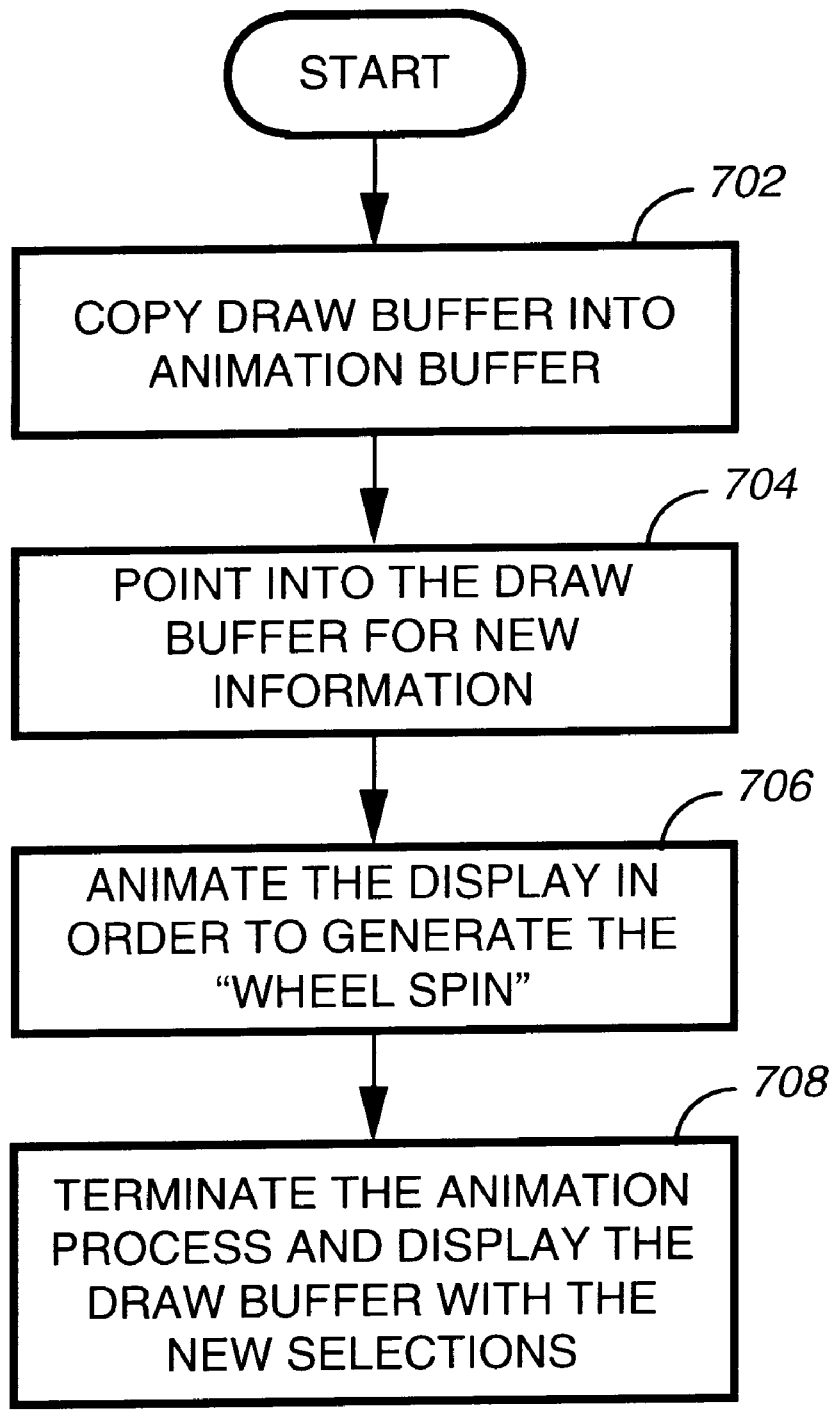
FIG. 7 shows a flowchart highlighting the basic operational steps in accordance with the preferred embodiment of the invention.

The basic algorithm which was graphically illustrated in FIG. 6, is shown in simplified flowchart form in FIG. 7. Upon the device user selecting a feature/option which is not currently being displayed on the display screen 68, the draw buffer information is copied into the animation buffer in step 702 (step 622 in FIG. 6). In step 704, the routine points into the draw buffer for new information. The display screen 68 is animated in step 706 in order to create the wheel spinning action. Finally, in step 708, the animation process is terminated and the draw buffer information is displayed showing the new option/feature (application) selections.

The present invention works well in small devices such as pagers, etc. since it only takes a pointer if the routine is implemented in the "C" programming language to keep track of the draw status in the draw buffer. When a user wants a feature/option which is currently not showing on the display, the main process signals the dormant animation process to begin. Then the main process continues to draw the next three buttons without any regard to animation except that it draws the new buttons bottom-to-top on a spin up of the wheel 420 and top-to-bottom on a spin down so the buttons appear in the animation buffer in proper sequence. The present invention draws straight into the on-screen buffer to reduce RAM usage and uses no inter-process communications to help reduce the processing requirements of the device.

If the animation designer can completely hide the progress of the draw buffer within the "blur" of the animation and the overall effect presented to the user is a smooth animation that starts with the currently viewed draw buffer screen, smoothly transitions through all of the incremental changes during the draw buffer update, and ends with the next view of the draw buffer. To the system designer, the present invention saves power over standard double-buffering animation and also saves on memory and processing overhead.

What is claimed is:

1. A method for providing a graphical user interface to an electronic device having a display, comprising the steps of:

presenting a plurality of user selectable fields located alone an arc on the display, each of the plurality of user selectable fields highlighting an application of the electronic device, wherein the applications being displayed represent a subset of a set of available applications;

selecting an application from the set of available applications;

determining that the application which has been selected is currently not being displayed in the plurality of user selectable fields;

commencing an animation process in which new applications currently not being displayed are selected from the set of available applications, rotated into the plurality of user selectable fields alone the arc, and displayed;

stopping the animation process; and presenting the plurality of user selectable fields on the display each highlighting the new applications of the electronic device which were not previously shown on the display.

2. A method as defined in claim 1, wherein in commencing the animation process step the new applications are rotated along the arc through the plurality of user selectable fields at a rate which causes a rotational effect when the display is being viewed by a user.

3. A method as defined in claim 1, wherein the step of commencing the animation process comprises:

(a) updating the plurality of user selectable fields by rotating into each of the plurality of user selectable fields a new application that is currently not being displayed;

(b) removing for each new application introduced in step (a) one of the previously highlighted applications; and (c) repeating steps (a) and (b) until all of the plurality of user selectable fields highlight new applications.

4. A method as defined in claim 3, wherein the animation process is stopped when all of the plurality of user selectable fields is updated with a new application.

5. A method as defined in claim 1, wherein each application which is displayed includes an icon.

6. A graphical user interface for an electronic device having a display, comprising:

a user control;

a plurality of user selectable buttons presented on the display, the plurality of user selectable buttons being located on the display along an arc;

a set of available applications, each of the set of available applications having associated graphics, wherein a subset of applications is selected from the set of available applications and displayed with their associated graphics within the plurality of user selectable buttons presented on the display; and a controller, in response to activation of the user control, causes the display to enter an animation mode when an application is selected that is not currently being displayed, in which the plurality of user selectable buttons presented on the display are caused to change their applications and associated graphics so as to make it appear that new applications and their associated graphics are rotating through the plurality of user selectable buttons along the arc.

7. A graphical user interface as defined in claim 6, wherein the applications and their associated graphics are scrolled through the plurality of user selectable buttons in either a clockwise or counterclockwise direction.

8. A graphical user interface as defined in claim 6, wherein the plurality of user selectable buttons does not change location within the display.

9. A graphical user interface as defined in claim 7, wherein the applications and their associated graphics are presented to the plurality of user selectable buttons in a predefined order.

10. A graphical user interface as defined in claim 6, further comprising a memory for storing the set of available applications and their associated graphics, said controller accessing the associated graphics and displaying them in the plurality of user selectable buttons in a sequential and predetermined order.

11. An electronic device including a display, has a set of available applications from which the user of the electronic device can choose, wherein a subset of the set of available applications is presented on the display within user selectable fields which are presented along an arc on the display, the electronic device, comprising:

a user control;

a controller coupled to the user control;

a memory coupled to the controller, the memory containing a draw buffer and an animation buffer; and the controller presents a first subset of the set of available applications within the plurality of user selectable fields, and the controller in response to an activation of the user control to select an application which is not currently being displayed, rotates through the plurality of user selectable fields along the arc a second subset of the set of available applications until the entire second subset of the set of available applications is displayed in the plurality of user selectable fields.

12. The electronic device defined in claim 11, wherein the controller draws into the draw buffer the first subset of the set of available applications into the plurality of user selectable fields and the contents of the draw buffer are displayed on the display.

13. The electronic device defined in claim 12, wherein in response to an activation of the user control, the controller causes the contents of the draw buffer to be copied onto the animation buffer.

14. The electronic device defined in claim 13, wherein further in response to the activation of the user control, the controller causes the draw buffer to be updated with the second subset of the set of available applications, and as each of the available applications from the second subset is being loaded into the draw buffer they are rotated into the animation buffer which upon receiving each of the available applications deletes one of the applications from the first subset of the set of available applications, the contents of the animation buffer are presented on the display.

15. The electronic device defined in claim 14, wherein once all of the applications from the second subset are rotated onto the animation buffer, the contents of the animation buffer are no longer presented on the display, instead, the contents of the draw buffer are caused to be displayed.

16. The electronic device as defined in claim 14, wherein the animation and draw buffers are executed using different processes that are running simultaneously in a multitasking environment under control of the controller.

17. A method for displaying at least first, second and third user selectable fields which are presented along an arc in a display, the method comprising the steps of:
presenting first, second and third applications which represent a subset of a set of available applications, one each displayed within the first, second and third user selectable fields; and
causing a fourth application selected from the set of available applications, to be displayed by causing the third application to no longer be displayed and rotating the first and second applications along the arc within the first, second and third user selectable fields.

18. The method defined in claim 17, wherein the first and second applications are rotated clockwise along the arc.

19. The method defined in claim 17, wherein the first and second applications are rotated counterclockwise along the arc.

20. A method of providing a graphical user interface for an electronic device, comprising the steps of:
displaying at least first, second and third user selectable fields which are presented along an arc in a display;
presenting a first subset of applications selected from a set of available applications, one each to each of the first, second and third user selectable fields; and
causing a second subset of applications selected from the set of available applications to be displayed one each at each of the first, second and third user selectable fields by rotating out of the first, second and third user selectable fields the first subset of applications and rotating in the second subset of applications when an application is selected which is not currently being displayed within the first second and third user selectable fields.

21. The method defined in claim 20, wherein the second subset of applications are rotated alone the arc into the first, second and third user selectable fields in a clockwise fashion.

22. The method defined in claim 20, wherein the second subset of applications are rotated alone the arc into the first, second and third user selectable fields in a counterclockwise fashion.

* * * * *